(12) United States Patent
Omori

(10) Patent No.: US 11,319,987 B2
(45) Date of Patent: May 3, 2022

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/011,434

(22) Filed: Sep. 3, 2020

(65) Prior Publication Data

US 2020/0408246 A1 Dec. 31, 2020

Related U.S. Application Data

(63) Continuation of application No. PCT/JP2019/009066, filed on Mar. 7, 2019.

(30) Foreign Application Priority Data

Mar. 7, 2018 (JP) .............................. JP2018-041245

(51) Int. Cl.
*F16C 17/02* (2006.01)
*F16C 27/02* (2006.01)

(52) U.S. Cl.
CPC ............ *F16C 17/024* (2013.01); *F16C 27/02* (2013.01)

(58) Field of Classification Search
CPC ................................ F16C 17/024; F16C 27/02
See application file for complete search history.

(56) References Cited

U.S. PATENT DOCUMENTS

| | | | |
|---|---|---|---|
| 4,465,384 A | 8/1984 | Heshmat et al. | |
| 5,902,049 A | 5/1999 | Heshmat | |
| 6,964,522 B2 | 11/2005 | Kang et al. | |
| 9,394,941 B2 * | 7/2016 | Ryu | ..................... F16C 32/0685 |
| 9,719,556 B2 * | 8/2017 | Kim | ......................... F16C 43/02 |
| 2004/0179759 A1 | 9/2004 | Katou et al. | |
| 2007/0183697 A1 | 8/2007 | Lee | |
| 2008/0253704 A1 | 10/2008 | Struziak et al. | |
| 2011/0052110 A1 | 3/2011 | Kim | |
| 2011/0103725 A1 | 5/2011 | Omori | |
| 2014/0147064 A1 | 5/2014 | Omori | |
| 2014/0241653 A1 | 8/2014 | Omori | |
| 2015/0030269 A1 | 1/2015 | Omori | |
| 2015/0159689 A1 | 6/2015 | Omori | |
| 2016/0010682 A1 | 1/2016 | Omori | |
| 2017/0097039 A1 | 4/2017 | Kim | |

FOREIGN PATENT DOCUMENTS

| | | |
|---|---|---|
| CN | 102003463 A | 4/2011 |
| CN | 103890423 A | 6/2014 |
| CN | 104204566 A | 12/2014 |
| CN | 104520598 A | 4/2015 |
| JP | 2003-021137 A | 1/2003 |

(Continued)

*Primary Examiner* — James Pilkington

(57) ABSTRACT

A radial foil bearing of the present disclosure includes a bearing housing that has an insertion hole into which a rotary shaft is inserted, a base sheet that is disposed in the insertion hole, a back foil that is supported by the base sheet and has unevenness in a radial direction of the insertion hole, and a top foil that is supported by the back foil. The base sheet has a branch deviated in the radial direction of the insertion hole, and is engaged with at least one of the bearing housing, the back foil, and the top foil.

16 Claims, 12 Drawing Sheets

(56) References Cited

FOREIGN PATENT DOCUMENTS

| | | |
|---|---|---|
| JP | 2004-270904 A | 9/2004 |
| JP | 2006-057652 A | 3/2006 |
| JP | 2007-522415 A | 8/2007 |
| JP | 2008-261496 A | 10/2008 |
| JP | 2009-299748 A | 12/2009 |
| JP | 2011-144846 A | 7/2011 |
| JP | 2012-092969 A | 5/2012 |
| JP | 2014-020463 A | 2/2014 |
| JP | 2018-009625 A | 1/2018 |
| KR | 10-2010-0095237 A | 8/2010 |
| WO | 2014/062373 A1 | 4/2014 |

\* cited by examiner

RADIAL FOIL BEARING

This application is a Continuation Application based on International Application No. PCT/JP2019/009066, filed on Mar. 7, 2019, which claims priority on Japanese Patent Application No. 2018-041245, filed on Mar. 7, 2018, the contents of which are incorporated herein by reference.

TECHNICAL FIELD

The present disclosure relates to a radial foil bearing.

BACKGROUND ART

In the related art, a radial bearing that is disposed and used outside a rotary shaft is known as a bearing for a high-speed rotating body. As such a radial bearing, a radial foil bearing including a thin plate-shaped top foil that forms a bearing surface, a back foil that elastically supports the top foil, and a cylindrical bearing housing that houses the top foil and the back foil is well known. As the back foil of the radial foil bearing, a bump foil obtained by forming a thin plate into a corrugated plate shape is mainly used.

In such a radial foil bearing, in a case where the back foil is configured by a plurality of back foil pieces, there is a possibility that the back foil pieces come off from the bearing housing. Therefore, for example, the back foil pieces are welded (spot welded) to a sheet-like member (hereinafter, referred to as a base sheet), and is incorporated into the bearing housing for each base sheet in some cases. Patent Document 1 below discloses a radial foil bearing including a "cartridge sheet (22)" which is a member corresponding to the base sheet. In addition, Patent Document 2 below discloses a radial foil bearing including a "bump sheet (5)" which is a member corresponding to the base sheet.

Patent Documents 3 to 5 each disclose a radial foil bearing using a back foil. Patent Document 6 discloses a radial foil bearing using a fixing tool.

CITATION LIST

Patent Document

[Patent Document 1]
U.S. Pat. No. 5,902,049
[Patent Document 2]
Published Japanese Translation No. 2007-522415 of the PCT International Publication
[Patent Document 3]
Japanese Unexamined Patent Application, First Publication No. 2006-57652
[Patent Document 4]
Japanese Unexamined Patent Application, First Publication No. 2004-270904
[Patent Document 5]
Japanese Unexamined Patent Application, First Publication No. 2009-299748
[Patent Document 6]
Japanese Unexamined Patent Application, First Publication No. 2014-20463

SUMMARY OF THE INVENTION

Technical Problem

When welding (spot welding) is used, there is a possibility that the back foil deforms. As a result, distortion occurs in the top foil, affecting a load capacity and dynamic characteristics (stiffness and attenuation) of the bearing. Thus, there is a possibility that a sufficient support capacity cannot be obtained.

The present disclosure is devised in view of the circumstances, and an object thereof is to suppress the disassembly and coming-off of a component of a radial foil bearing without using welding.

Solution to Problem

According to a first aspect of the radial foil bearing of the present disclosure, there is provided a radial foil bearing including a bearing housing that has an insertion hole into which a shaft is inserted, a base sheet that is disposed in the insertion hole, a back foil that is supported by the base sheet and has unevenness in a radial direction of the insertion hole, and a top foil that is supported by the back foil. The base sheet has a branch separated in the radial direction of the insertion hole, and is engaged with at least one of the bearing housing, the back foil, and the top foil.

According to a second aspect of the radial foil bearing of the present disclosure, in the radial foil bearing of the first aspect, the back foil may have a notch in an end edge in an axial direction in which the insertion hole extends. An extension portion extending from the branch of the base sheet may be inserted in the notch.

According to a third aspect of the radial foil bearing of the present disclosure, in the radial foil bearing of the second aspect, on an inner peripheral side of the back foil passing through the notch, the extension portion may extend to any one side in a circumferential direction of the insertion hole.

According to a fourth aspect of the radial foil bearing of the present disclosure, in the radial foil bearing of the third aspect, the base sheet may include a first base sheet that has the extension portion and a notch in an end edge in the axial direction and a second base sheet that supports the first base sheet and has a second extension portion inserted into the notches of the first base sheet and the back foil. On the inner peripheral side of the back foil, the second extension portion may extend to the other side in the circumferential direction of the insertion hole.

According to a fifth aspect of the radial foil bearing of the present disclosure, in the radial foil bearing of any one of the first to fourth aspects, a through-groove extending in the axial direction from an end surface of the bearing housing may be formed in the insertion hole. An extension portion extending from the branch of the base sheet may be inserted in the through-groove.

According to a sixth aspect of the radial foil bearing of the present disclosure, in the radial foil bearing of the fifth aspect, an end portion of the top foil may be inserted into the through-groove. The base sheet may have an engaging protrusion portion that extends onto the through-groove and engages with the end portion of the top foil in the radial direction.

According to a seventh aspect of the radial foil bearing of the present disclosure, in the radial foil bearing of the sixth aspect, a first end and a second end may be inserted as the end portions of the top foil into the through-groove. The top foil may have a part extending from the first end to one side in the circumferential direction and a part extending from the second end to the other side in the circumferential direction, which intersect each other in the axial direction. The engaging protrusion portion may extend onto the through-groove and engage with both of the intersecting ends of the top foil in the radial direction.

According to an eighth aspect of the radial foil bearing of the present disclosure, in the radial foil bearing of any one of the first to seventh aspects, a housing groove that is provided in an end surface of the bearing housing in the axial direction and extends toward an outer side in the radial direction from an inner peripheral edge of the insertion hole may be further included. An extension portion extending from the branch of the base sheet may be inserted in the housing groove.

According to a ninth aspect of the radial foil bearing of the present disclosure, in the radial foil bearing of any one of the second to eighth aspects, a lid body that is attached to an end surface of the bearing housing in the axial direction and covers the extension portion may be further included.

In the present disclosure, the disassembly and coming-off of the component of the radial foil bearing can be suppressed without using welding.

DETAILED DESCRIPTION OF THE EMBODIMENTS

Hereinafter, a radial foil bearing of the present disclosure will be described in detail with reference to the drawings.

Figure 1:
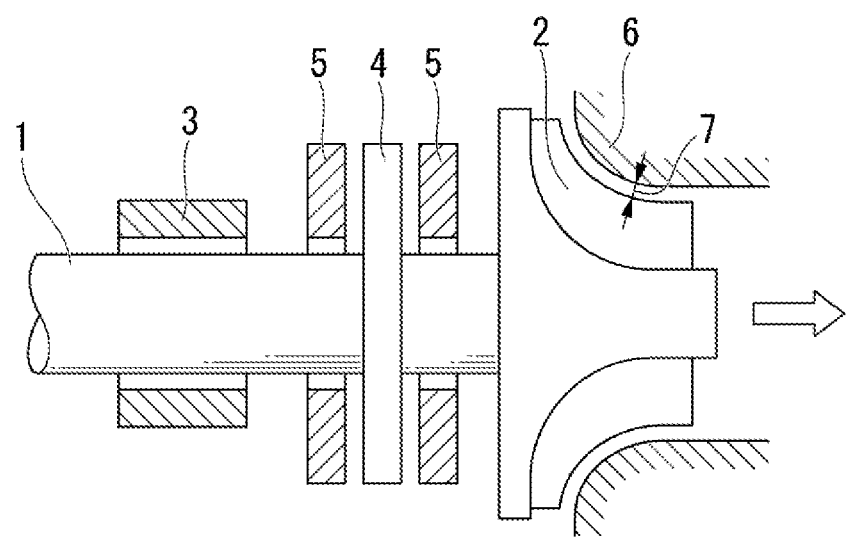
FIG. 1 is a side view illustrating an example of a turbomachine to which a radial foil bearing of the present disclosure is applied.

FIG. 1 is a side view illustrating an example of a turbomachine to which a radial foil bearing of the present disclosure is applied.

In FIG. 1, the reference sign 1 indicates a rotary shaft (shaft), the reference sign 2 indicates an impeller provided at a tip of the rotary shaft on one side in an axial direction of the rotary shaft 1, and the reference sign 3 indicates the radial foil bearing according to the present disclosure. Although only one radial foil bearing is illustrated in FIG. 1 for the sake of simplicity, normally two radial foil bearings are provided in the axial direction of the rotary shaft 1. Therefore, two radial foil bearings 3 are provided also in the embodiment.

The radial foil bearing 3 is disposed outside the rotary shaft 1. A thrust collar 4 is provided between the impeller 2 of the rotary shaft 1 and the radial foil bearing 3. Thrust bearings 5 are disposed (inserted) on both sides of the thrust collar 4 in the axial direction. The impeller 2 is disposed in a housing 6, which is a stationary side, and a tip clearance 7 is provided between the housing 6 and the impeller 2.

First Embodiment

Figure 2:
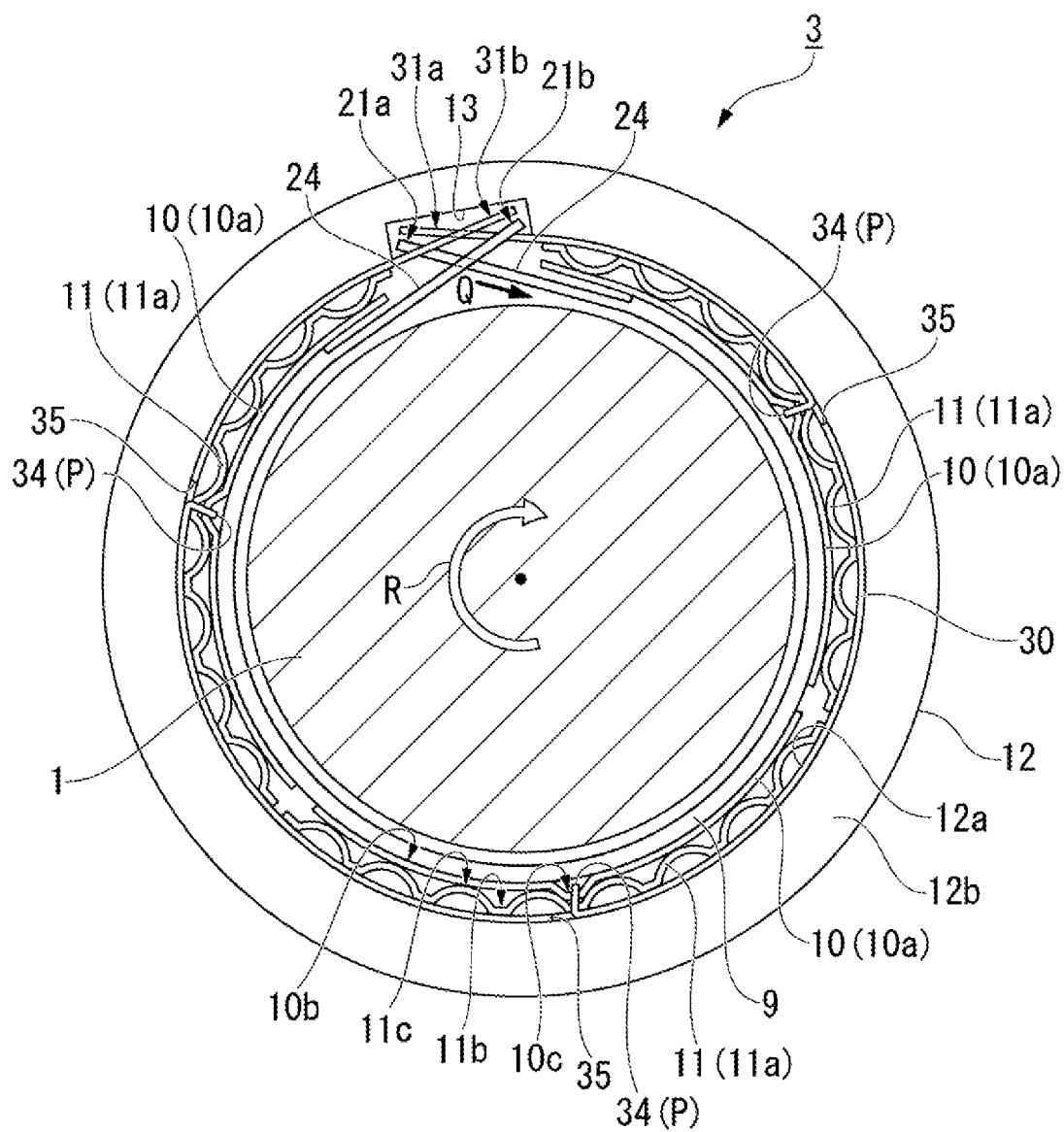
FIG. 2 is a front view illustrating a radial foil bearing according to a first embodiment of the present disclosure.

FIG. 2 is a front view illustrating the radial foil bearing 3 according to a first embodiment of the present disclosure.

The radial foil bearing 3 is a bearing that is disposed outside the rotary shaft 1 and supports the rotary shaft 1. The radial foil bearing 3 includes a top foil 9, an intermediate foil 10, a back foil 11, a base sheet 30, and a bearing housing 12. The bearing housing 12 has an insertion hole 12a through which the rotary shaft 1 is inserted.

In the following description, a positional relationship between respective members may be described with the insertion hole 12a as reference. Specifically, the "axial direction" refers to a direction in which the insertion hole 12a extends (a direction in which the rotary shaft 1 is inserted). In addition, a "radial direction" refers to a radial direction of the insertion hole 12a. In addition, a "circumferential direction" refers to a circumferential direction along an inner peripheral surface of the insertion hole 12a.

The bearing housing 12 is a cylindrical member that configures an outermost portion of the radial foil bearing 3 in the radial direction. The insertion hole 12a is formed in the bearing housing 12. The base sheet 30, the back foil 11, the intermediate foil 10, and the top foil 9 are housed in the insertion hole 12a. Specifically, the base sheet 30 is supported by the inner peripheral surface of the insertion hole 12a. The back foil 11 is supported by the base sheet 30. The intermediate foil 10 is supported by the back foil 11. The top foil 9 is supported by the intermediate foil 10. The bearing housing 12 of the present disclosure is a cylindrical member including the insertion hole 12a. However, the bearing housing 12 may be a member having other than a cylindrical shape (for example, a prismatic member) insofar as the bearing housing 12 has the insertion hole 12a.

Figure 3A:
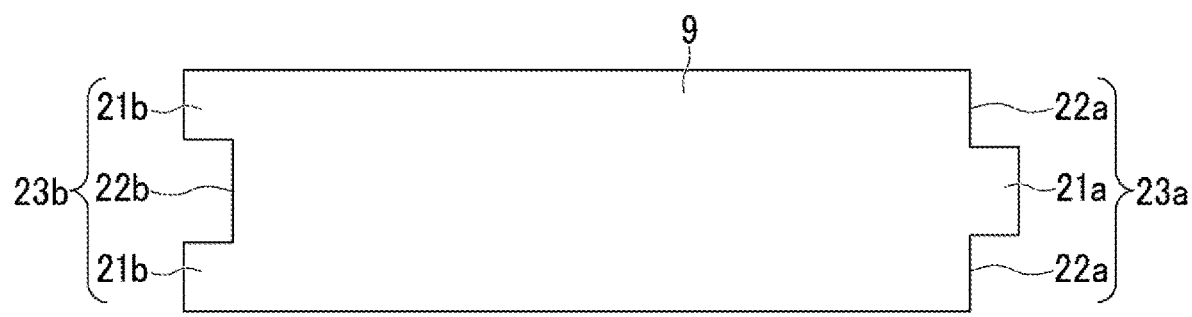
FIG. 3A is an unfolded plan view of a top foil according to the first embodiment of the present disclosure.

FIG. 3A is an unfolded plan view of the top foil 9 according to the first embodiment of the present disclosure.

Figure 3B:
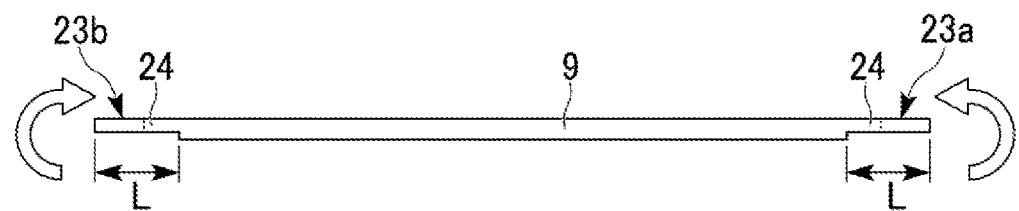
FIG. 3B is an unfolded front view of the top foil according to the first embodiment of the present disclosure.

FIG. 3B is an unfolded front view of the top foil 9 according to the first embodiment of the present disclosure.

As illustrated in FIG. 3A, the top foil 9 is a rectangular metal foil having a long side in the circumferential direction and a short side in the axial direction. As illustrated in FIG. 2, the top foil 9 is wound in a cylindrical shape and is disposed to face a peripheral surface of the rotary shaft 1.

As illustrated in FIG. 3A, on one short side (end portion, first end) of the top foil 9 in a long side direction, a first uneven portion 23a having one protruding portion 21a protruding to a first side in the long side direction and two recessed portions 22a formed on both sides of the protruding portion 21a in a short side direction is formed.

That is, a first short side of the top foil 9 in the long side direction includes one protruding portion 21a protruding to the first side in the long side direction and a step connected to both sides of the protruding portion 21a in the short side direction.

In addition, on a second short side (a short side (end portion, second end) positioned on a second side in the long side direction) which is opposite to the first short side of the top foil 9, a second uneven portion 23b having two protruding portions 21b spaced apart from each other in the short side direction and one recessed portion 22b positioned between the two protruding portions 21b is formed. Alternatively, on the short side of the top foil 9 positioned on the second side in the long side direction, the recessed portion 22b recessed to the first side in the long side direction and steps positioned on both sides of the recessed portion 22b in the short side direction are provided.

The recessed portion 22b of the second uneven portion 23b is formed to correspond to the protruding portion 21a of the first uneven portion 23a. In addition, the recessed portions 22a of the first uneven portion 23a are formed to correspond to the protruding portions 21b of the second uneven portion 23b. That is, a minimum width (interval) of the recessed portion 22b in the short side direction is larger than a maximum width of the protruding portion 21a in the short side direction. The length (interval) of the recessed portion 22b in the long side direction and the length (interval) of the protruding portion 21a in the long side direction of the present disclosure are the same in the long side direction.

When the top foil 9 is wound in a cylindrical shape such that the first uneven portion 23a and the second uneven portion 23b overlap each other, the recessed portion 22b of the second uneven portion 23b is formed such that the protruding portion 21a passes through the recessed portion 22b. Similarly, when the top foil 9 is wound in a cylindrical shape, the recessed portions 22a of the first uneven portion 23a are formed such that the protruding portions 21b pass through the recessed portions 22a respectively. That is, the top foil 9 is formed such that a part (protruding portion 21a) which extends from the first end (first short side) to one side in the circumferential direction and a part (protruding portion 21b) which extends from the second end (second short side) to the other side in the circumferential direction intersect each other in the axial direction.

The protruding portions 21a and 21b (both ends of the top foil 9) that have passed through the recessed portions 22b and 22a are respectively extracted to a bearing housing 12 side, as illustrated in FIG. 2. That is, when the top foil 9 disposed on an inner peripheral side of the insertion hole 12a is seen from the axial direction, the protruding portion 21a and the protruding portions 21b intersect each other. In addition, the protruding portion 21a of the top foil 9 is positioned between the two protruding portions 21b in the axial direction. In the bearing housing 12, a through-groove 13 into which the protruding portions 21a and 21b are inserted is formed in the inner peripheral surface of the insertion hole 12a. The through-groove 13 is formed from one end surface 12b to the other end surface 12b of the bearing housing 12 in the axial direction.

As illustrated in FIG. 3B, on a side where the first uneven portion 23a is formed (side of the first short side) and a side where the second uneven portion 23b is formed (side of the second short side), thin wall portions 24, which each have a small thickness (thin wall) compared to a middle portion therebetween, are formed in the top foil 9. As illustrated in FIG. 2, an outer peripheral surface (a surface on the bearing housing 12 side) of each of the thin wall portions 24 is recessed and thin more than an outer peripheral surface of the middle portion of the top foil 9.

As illustrated in FIG. 2, a length L of the thin wall portion 24 in the circumferential direction is set to a length corresponding to the through-groove 13 and one crest portion 11c at an end portion of the back foil 11. In the present disclosure, the top foil 9 disposed in the bearing housing 12 includes a step on the outer peripheral surface side and becomes thin via the step. In addition, the thin wall portions 24 extend from both ends of the top foil 9 in the circumferential direction to circumferential positions beyond the closest crest portions 11c.

The back foil 11 is disposed between the base sheet 30 and the intermediate foil 10. The back foil 11 is a foil (thin plate) that elastically supports the intermediate foil 10 and the top foil 9. As such a back foil 11, for example, a bump foil, spring foils described in Patent Document 3 and Patent Document 4, and a back foil described in Patent Document 5 are used. In the embodiment, a bump foil is used as the back foil 11.

The back foil 11 of the present disclosure is configured by three (a plurality of) back foil pieces 11a disposed along the inner peripheral surface of the insertion hole 12a. The back foil pieces 11a each have a foil (thin plate) that is corrugated in the circumferential direction. The three back foil pieces 11a are curved to have a substantially cylindrical shape as a whole when seen from the axial direction. That is, the back foil pieces 11a are disposed along the inner peripheral surface of the insertion hole 12a. In the present disclosure, all of the three back foil pieces 11a are formed in the same shape and dimension. Therefore, the back foil pieces 11a are disposed by dividing the inner peripheral surface of the insertion hole 12a into substantially three in the circumferential direction.

The back foil pieces 11a each are formed such that the crest portion 11c protruding to an inner side in the radial direction and a trough portion 11b protruding to an outer side in the radial direction when seen from the crest portion 11c alternate in the circumferential direction. That is, the back foil piece 11a (back foil 11) has unevenness in the circumferential direction of the insertion hole 12a. A flat portion of the trough portion 11b facing the base sheet 30 can come into contact with the base sheet 30. In addition, the crest portion 11c can come into contact with the intermediate foil 10 (intermediate foil piece 10a). As described above, the back foil piece 11a elastically support by the crest portions 11c the top foil 9 via the intermediate foil piece 10a. Both ends of the back foil piece 11a in the circumferential direction are the trough portions 11b.

The intermediate foil 10 is disposed between the top foil 9 and the back foil 11. In the present disclosure, the intermediate foil 10 is configured by three intermediate foil pieces 10a disposed along the inner peripheral surface of the insertion hole 12a. The three intermediate foil pieces 10a each have a substantially rectangular unfolded shape, and are curved in a substantially cylindrical shape as a whole when seen from the axial direction, as illustrated in FIG. 2. In the present disclosure, all of the three intermediate foil pieces 10a are formed in the same shape and dimension. Therefore, the intermediate foil pieces 10a are disposed by dividing the inner peripheral surface of the insertion hole 12a into substantially three in the circumferential direction.

The thickness of the intermediate foil piece 10a is smaller than the back foil piece 11a. The stiffness of the intermediate foil 10 is equal to or lower than half the stiffness of the back foil 11. The outer shape of the intermediate foil piece 10a has substantially the same size as the outer shape of the back foil piece 11a. The intermediate foil piece 10a has a flat surface portion 10b that is in contact with a top portion of the crest portion 11c of the back foil 11 and a groove portion 10c that is recessed (protruding) to the outer side in the radial direction than the flat surface portion 10b. That is, the groove portion 10c is spaced apart from the top foil 9, and the flat surface portion 10b is in contact with the top foil 9. The groove portion 10c is formed at a circumferential position between both ends of the intermediate foil piece 10a in the circumferential direction (a middle position of the intermediate foil piece 10a in the circumferential direction in the present disclosure). Parts on both sides of the groove portion 10c of the intermediate foil piece 10a can come into contact with the crest portions 11c on both sides of the trough portion 11b of the back foil piece 11a that faces the groove portion 10c.

Figure 4:
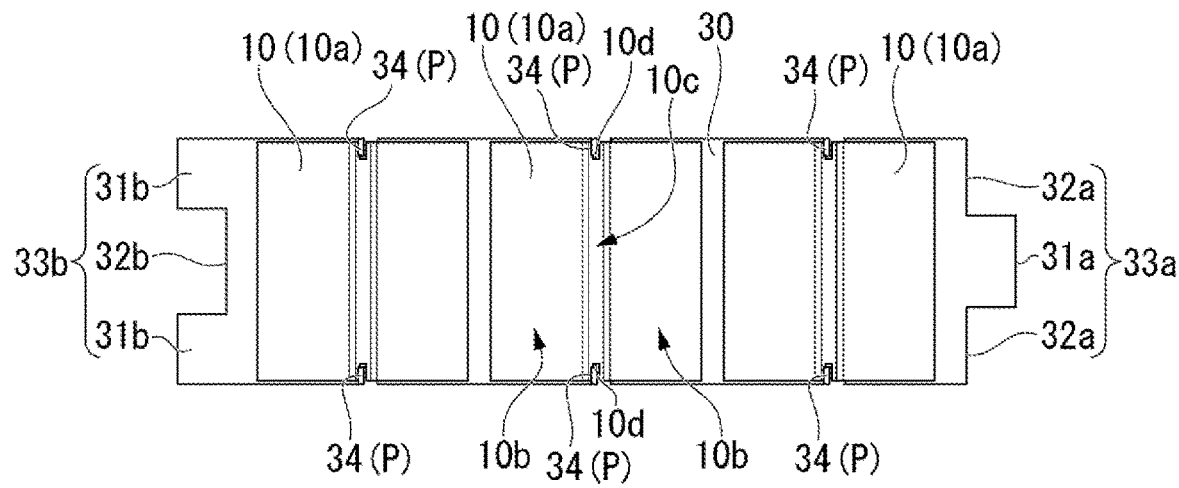
FIG. 4 is an unfolded plan view of a base sheet in a state of being engaged with an intermediate foil and a back foil according to the first embodiment of the present disclosure.
Figure 5:
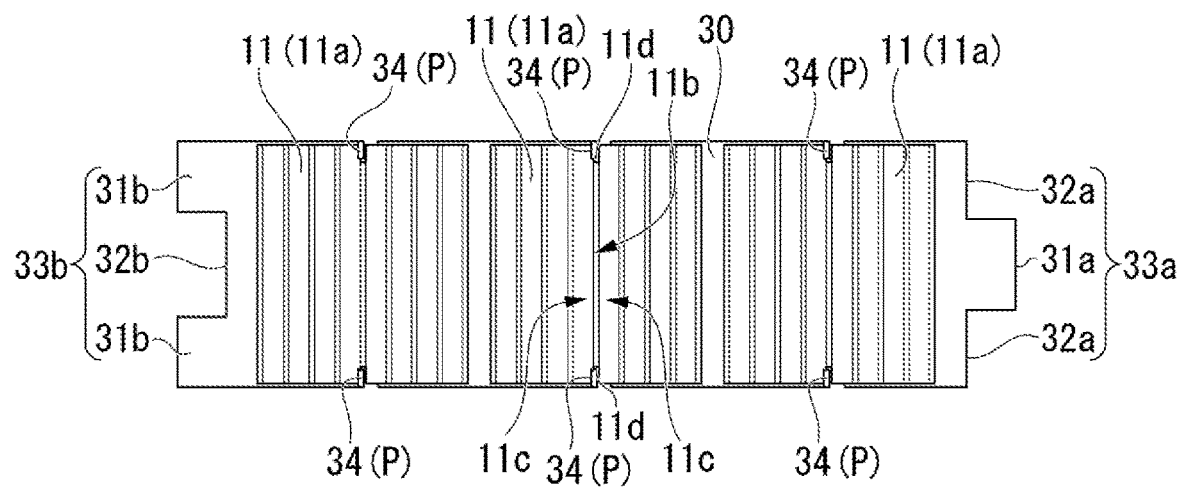
FIG. 5 is an unfolded plan view of the base sheet in a state of being engaged with the back foil according to the first embodiment of the present disclosure.
Figure 6:
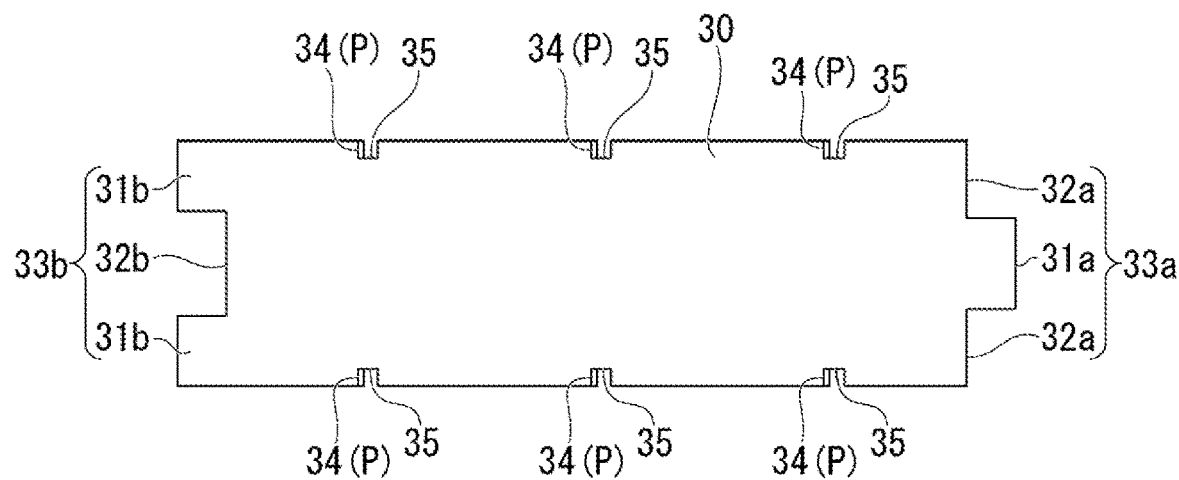
FIG. 6 is an unfolded plan view of the base sheet according to the first embodiment of the present disclosure.
Figure 7:
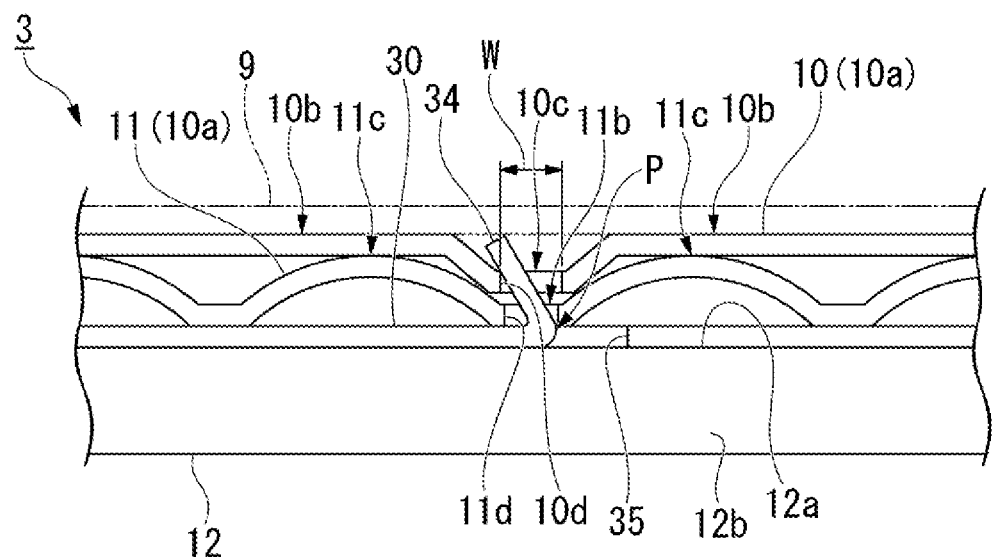
FIG. 7 is an enlarged front view illustrating a state where the base sheet is engaged with the intermediate foil and the back foil according to the first embodiment of the present disclosure.

FIG. 4 is an unfolded plan view of the base sheet 30 in a state of being engaged with the intermediate foil 10 and the back foil 11 according to the first embodiment of the present disclosure. That is, in FIG. 4, the back foil 11 (back foil piece a) (not illustrated) is disposed below the intermediate foil 10 (intermediate foil piece 10a). FIG. 5 is an unfolded plan view of the base sheet 30 in a state of being engaged with the back foil 11 according to the first embodiment of the present disclosure. That is, in FIG. 5, the intermediate foil 10 (intermediate foil piece 10a) is removed from the base sheet 30. FIG. 6 is an unfolded plan view of the base sheet 30 according to the first embodiment of the present disclosure. FIG. 7 is an enlarged front view illustrating a state where the base sheet 30 is engaged with the intermediate foil 10 and the back foil 11 according to the first embodiment of the present disclosure. Herein, FIG. 7 corresponds to a case where FIG. 2 is seen from an opposite side in the axial direction.

As illustrated in FIGS. 4 to 6, the base sheet 30 is a rectangular metal foil having a long side in the circumferential direction and a short side in the axial direction. As illustrated in FIG. 2, the base sheet 30 is wound in a cylindrical shape and is disposed on the inner peripheral surface of the insertion hole 12a. Similar to the top foil 9, on a first short side of the base sheet 30 in the long side direction, a first uneven portion 33a having one protruding portion 31a protruding to the first side in the long side direction and two recessed portions 32a formed on both sides of the protruding portion 31a in the short side direction is formed. That is, the first short side of the base sheet 30 in the long side direction includes one protruding portion 31a protruding to the first side in the long side direction and a step connected to both sides of the protruding portion 31a in the short side direction.

In addition, on a second short side (a short side positioned on the second side in the long side direction) which is opposite to the first short side of the base sheet 30, a second uneven portion 33b having two protruding portions 31b spaced apart from each other in the short side direction and one recessed portion 32b positioned between the two protruding portions 31b is formed. Alternatively, on the short side of the base sheet 30 positioned on the second side in the long side direction, the recessed portion 32b recessed to the first side in the long side direction and steps positioned on both sides of the recessed portion 32b in the short side direction are provided.

The recessed portion 32b of the second uneven portion 33b is formed to correspond to the protruding portion 31a of the first uneven portion 33a. In addition, the recessed portions 32a of the first uneven portion 33a are formed to correspond to the protruding portions 31b of the second uneven portion 33b. That is, a minimum width (interval) of the recessed portion 32b in the short side direction is larger than a maximum width of the protruding portion 31a in the short side direction. In addition, the length (interval) of the recessed portion 32b in the long side direction and the length (interval) of the protruding portion 31a in the long side direction are the same in the long side direction. In addition, when the base sheet 30 is wound in a cylindrical shape such that the first uneven portion 33a and the second uneven portion 33b overlap each other, the recessed portion 32b of the second uneven portion 33b is formed such that the protruding portion 31a passes through the recessed portion 32b. Similarly, when the base sheet 30 is wound in a cylindrical shape, the recessed portions 32a of the first uneven portion 33a are formed such that the protruding portions 31b pass through the recessed portions 32a respectively.

The protruding portions 31a and 31b (both ends of the base sheet 30) that have passed through the recessed portions 32b and 32a are respectively extracted to the bearing housing 12 side to be inserted into the through-groove 13, as illustrated in FIG. 2. That is, when the base sheet 30 disposed on the inner peripheral side of the insertion hole 12a is seen from the axial direction, the protruding portion 31a and the protruding portions 31b intersect each other. In addition, the protruding portion 31a of the base sheet 30 is positioned between the two protruding portions 31b in the axial direction. Further, the protruding portion 31a of the base sheet 30 intersects the protruding portions 21b of the top foil 9. In addition, the protruding portions 31b of the base sheet 30 intersect the protruding portion 21a of the top foil 9.

That is, the recessed portion 32b of the base sheet 30 is formed such that the protruding portion 21a of the top foil 9 passes therethrough. Similarly, the recessed portion 22b of the top foil 9 is formed such that the protruding portion 31a of the base sheet 30 passes therethrough. That is, a minimum length of the recessed portion 32b of the base sheet 30 in the short side direction is larger than a maximum width of each of the protruding portion 31a of the base sheet 30 and the protruding portion 21a of the top foil 9 in the short side direction. In addition, the minimum length of the recessed portion 22b of the top foil 9 in the short side direction is larger than the maximum width of each of the protruding portion 21a of the top foil 9 and the protruding portion 31a of the base sheet 30 in the short side direction. The length of the recessed portion 32b of the base sheet 30 in the long side direction and the length of the protruding portion 31a in the long side direction are the same in the long side direction.

As illustrated in FIG. 5, the back foil piece 11a includes notches 11d in both end edges in the axial direction (an up-and-down direction of the page of FIG. 5). The notches 11d are formed in the trough portion 11b of the back foil piece 11a. The notches 11d are formed at circumferential positions between both ends of the back foil piece 11a in the circumferential direction (middle positions of the back foil piece 11a in the circumferential direction in the present disclosure). In addition, the notches 11d are formed at circumferential positions between the two crest portions 11c formed in the back foil piece 11a. That is, the back foil piece 11a has recesses in the axial direction at the circumferential positions of both end edges in the axial direction.

In addition, as illustrated in FIG. 4, the intermediate foil piece 10a includes notches 10d in both end edges in the axial direction (an up-and-down direction of the page of FIG. 4). The notches 10d are formed in the groove portion 10c of the intermediate foil piece 10a. The notches 10d are formed at circumferential positions between both ends of the intermediate foil piece 10a in the circumferential direction (middle positions of the intermediate foil piece 10a in the circumferential direction in the present disclosure). That is, the intermediate foil piece 10a has recesses in the axial direction at the circumferential positions of both end edges in the axial direction.

The notch 10d is formed by notching a part of a bottom portion of the groove portion 10c formed between the flat surface portion 10b and the flat surface portion 10b toward a middle portion of the intermediate foil piece 10a in the axial direction. The notch 10d is formed at a position corresponding to the notch 11d of the back foil piece 11a, that is, a position overlapping the notch 11d. The width of the notch 10d is formed to be substantially the same as the width of the notch 11d. Extension portions 34 extending from branches P of the base sheet 30 are engaged with the notches 10d and 11d. That is, each extension portion 34 extends from an outer peripheral side to an inner peripheral side of the back foil piece 11a in a state that both sides of the extension portion 34 in the circumferential direction are interposed between edges of the notch 11d. Similarly, the extension portion 34 extends from an outer peripheral side to an inner peripheral side of the intermediate foil piece 10a in a state that both sides of the extension portion 34 in the circumferential direction are interposed between edges of the notch 10d. That is, the extension portion 34 is inserted into the back foil 11 and the intermediate foil 10 in a state that both sides of the extension portion 34 in the circumferential direction face the edges of the notch 11d of the back foil 11 and edges 10d of the notch of the intermediate foil 10.

As illustrated in FIG. 7, the base sheet 30 has the branches P that are deviated in the radial direction of the insertion hole 12a (an up-and-down direction of the page of FIG. 7). Then, the extension portion 34 extends via the branch P. The branch P according to the first embodiment is deviated to the inner side in the radial direction of the insertion hole 12a (an upper side of the page of FIG. 7). That is, the extension portion 34 extends toward the inner side in the radial direction from the branch P. As illustrated in FIG. 6, the branches P are formed at both end edges of the base sheet 30 in the axial direction (an up-and-down direction of the page of FIG. 6). A plurality (three on each of both end edges (six in total)) of branches P are formed at both end edges of the base sheet 30 at equal intervals in the circumferential direction. That is, three branches P are formed to correspond to the intermediate foil pieces 10a and the back foil pieces 11a.

The extension portion 34 extending from the branch P is formed by cutting and raising a part of the base sheet 30, as illustrated in FIG. 7. The extension portion 34 is a "barb" that extends in an obtuse angle direction with respect to a sheet surface of the base sheet 30. As illustrated in FIG. 6, a notch 35 is formed at a position adjacent to the extension portion 34 (branch P). That is, the base sheet 30 has recesses in the axial direction in the vicinity of positions where the extension portions 34 are formed at both end edges in the axial direction. As illustrated in FIG. 7, the extension portion 34 is inserted into the notch 11d and the notch 10d. On the inner peripheral side of the intermediate foil 10 passing through the notches 11d and the notches 10d, the extension portions 34 extend to one side of the insertion hole 12a in the circumferential direction (left side of the page of FIG. 7).

Specifically, on the inner side in the radial direction of the intermediate foil 10 (intermediate foil piece 10a) that has passed through the notch 10d, the extension portion 34 extends to the outside of a formation range W of the notch 10d in the circumferential direction. Since the notch 10d has the formation range W slightly larger than the notch 11d of the back foil 11 (back foil piece 11a) in the circumferential direction, the extension portion 34 extends to the outside of a formation range of the notch 11d in the circumferential direction, on the inner side in the radial direction of the back foil 11 (back foil pieces 11a) passing through the notch 11d. That is, a portion of the extension portion 34 on the inner side than the intermediate foil 10 is disposed to at least partially overlap the intermediate foil 10 in the radial direction. The extension portion 34 is housed in the groove portion 10c of the intermediate foil 10 so as not to interfere with the top foil 9.

Next, the operation of the radial foil bearing 3 including such a configuration will be described.

In a state where the rotary shaft 1 is stopped, the top foil 9 is biased toward a rotary shaft 1 side by the back foil 11 (three back foil pieces 11a) via an intermediate foil 10 (three intermediate foil pieces 10a) to be brought into close contact with the rotary shaft 1. In the embodiment, since both end portions of the top foil 9 are the thin wall portions 24, a force (local preload) for tightening the rotary shaft 1 in the thin wall portions 24 is alleviated compared to a case where there is no thin wall portion 24.

Then, when the rotary shaft 1 is rotated in an arrow R direction in FIG. 2, the rotary shaft starts to rotate at a low speed initially, and then gradually accelerates to rotate at a high speed. Then, as indicated with an arrow Q in FIG. 2, an ambient fluid is drawn in from one end side of each of the top foil 9, the intermediate foil 10, and the back foil 11, and flows into a space between the top foil 9 and the rotary shaft 1. Accordingly, a fluid lubrication film is formed between the top foil 9 and the rotary shaft 1.

A film pressure of the fluid lubrication film acts on the top foil 9, and the crest portions 11c of each back foil piece 11a are pressed via the intermediate foil 10 which is in contact with the top foil 9. Then, as the back foil piece 11a is pressed by the intermediate foil 10, the crest portions 11c of the back foil piece 11a are pressed and spread. Consequently, the back foil piece 11a is about to move on the bearing housing 12 in the circumferential direction of the bearing housing 12. That is, since the back foil piece 11a (back foil 11) elastically supports the top foil 9 via the intermediate foil 10, the back foil piece 11a allows the top foil 9 and the intermediate foil 10 to bend by deforming in the circumferential direction of the back foil piece 11a when a load is received from the top foil 9, thereby supporting the top foil 9 and the intermediate foil 10.

Herein, as illustrated in FIGS. 5 and 7, the extension portion 34 extending from the branch P of the base sheet 30 is inserted into the notch 11d formed in the end edge of the back foil piece 11a in the axial direction. Since the protruding portions 31a and 31b of the base sheet 30 are engaged with the through-groove 13 of the bearing housing 12 together with the top foil 9 as illustrated in FIG. 2, the extension portion 34 serves as a rotation stopper for the back foil piece 11a. Therefore, the crest portions 11c of each back foil piece 11a deform (move) in the circumferential direction with the notch 11d, into which the extension portion 34 is inserted, interposed therebetween.

In addition, as illustrated in FIG. 5, the extension portions 34 are respectively inserted in the notches 11d in both end edges of the back foil piece 11a in the axial direction, and also suppress the movement of the back foil piece 11a in the axial direction. Further, as illustrated in FIG. 7, on the inner peripheral side of the back foil 11 that has passed through the notch 11d, the extension portion 34 extends to the outside of the formation range of the notch 11d in the circumferential direction of the insertion hole 12a. That is, the extension portion 34 of the base sheet 30 has a "barb" formed on the inner peripheral side of the back foil 11 that has passed through the notch 11d, and this retains the back foil piece 11a in the radial direction. That is, the extension portion 34 extends from the notch 11d to a circumferential side opposite to a rotation direction of the rotary shaft 1. Accordingly, the disassembly and coming-off of the back foil 11 are suppressed.

The extension portion 34 may extend from the notch 11d in the rotation direction of the rotary shaft 1. Even in this case, the extension portion 34 suppresses the disassembly and coming-off of the back foil 11.

Similar to the back foil piece 11a, the notch 10d is also formed in the intermediate foil piece 10a, and the extension portion 34 is inserted therein. For this reason, the disassembly and coming-off of the intermediate foil 10 are also suppressed. When a load is transmitted from the top foil 9 to the back foil piece 11a, the intermediate foil piece 10a bends together with the top foil 9 and the back foil piece 11a, but "slip" occurs between the intermediate foil piece 10a and the top foil 9 or the back foil piece 11a at the time.

That is, when pressure fluctuations occur in the fluid lubrication film due to shaft vibration of the rotary shaft 1, the pressure fluctuations are transmitted to the top foil 9 and "slip" occurs. Since this "slip" causes energy dissipation due to friction and attenuates film pressure fluctuations, the shaft vibration of the rotary shaft 1 is suppressed.

In addition, when a fluctuating load (repetition of loading and unloading) due to the shaft vibration of the rotary shaft 1 acts on the back foil piece 11a and the load is on an unloading side, the back foil piece 11a slightly rises to the inner side in the radial direction of the insertion hole 12a of the bearing housing 12. At this time, a barb portion of the extension portion 34 is hooked onto the back foil piece 11a (intermediate foil piece 10a), and the base sheet 30 is lifted together with the back foil piece 11a. Herein, in a case where the base sheet 30 is lifted, "slip" occurs between the base sheet 30 and the insertion hole 12a of the bearing housing 12, and between the base sheet 30 and the back foil piece 11a, causing energy dissipation due to friction and contributing as attenuation. On the other hand, when the load acting on the back foil piece 11a shifts to a loading side, the back foil piece 11a returns to an original position, but at that time as well, "slip" occurs due to the base sheet 30, causing energy dissipation due to friction and contributing as attenuation.

As described above, in the first embodiment described above, since the base sheet 30 has the branches P that are deviated in the radial direction of the insertion hole 12a, and the extension portions 34 extending from the branches P are engaged with the back foil 11 and the intermediate foil 10, the disassembly of the back foil 11 and the intermediate foil 10 and the coming-off of the back foil 11 and the intermediate foil 10 from the bearing housing 12 can be suppressed.

Second Embodiment

Next, a second embodiment of the present disclosure will be described. In the following description, configurations which are the same or equivalent to the embodiment described above will be assigned with the same reference signs, and a description thereof will be simplified or omitted.

Figure 8:
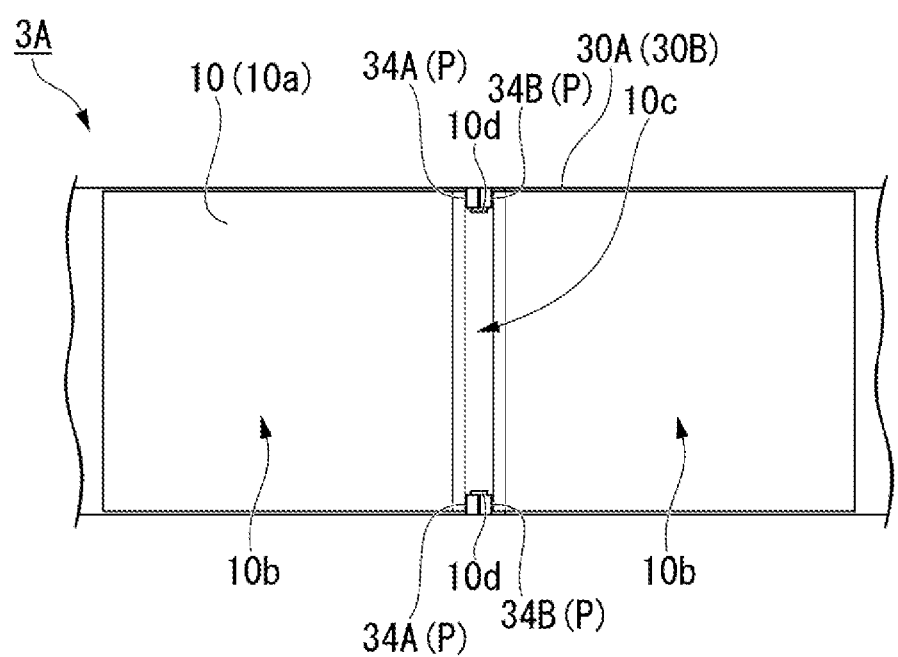
FIG. 8 is an unfolded and enlarged plan view of a first base sheet and a second base sheet in a state of being engaged with an intermediate foil and a back foil according to a second embodiment of the present disclosure.
Figure 9A:
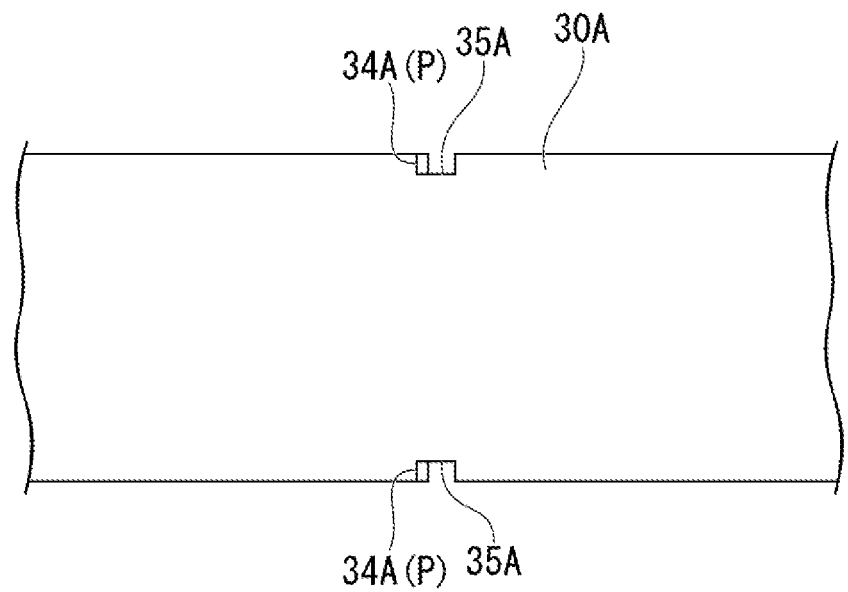
FIG. 9A is an unfolded and enlarged plan view of the first base sheet according to the second embodiment of the present disclosure.
Figure 9B:
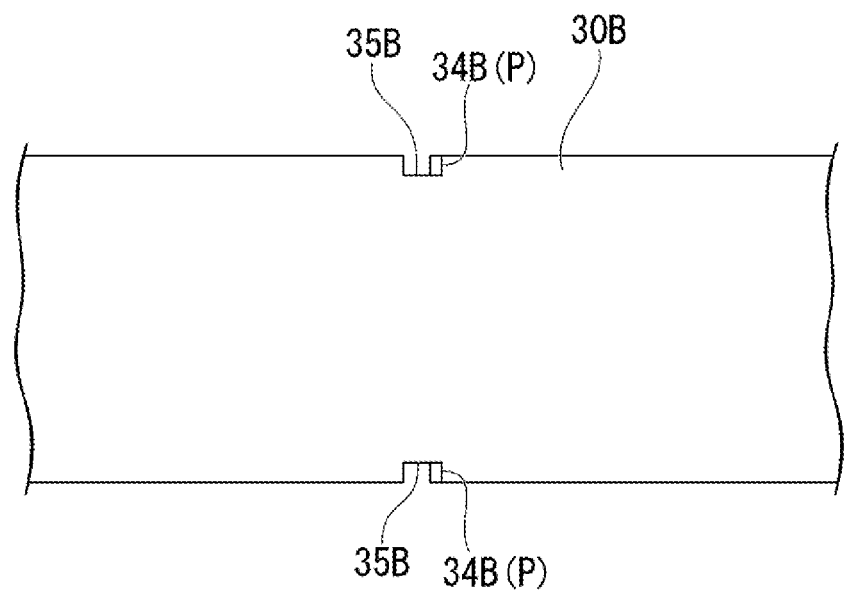
FIG. 9B is an unfolded and enlarged plan view of the second base sheet according to the second embodiment of the present disclosure.
Figure 10:
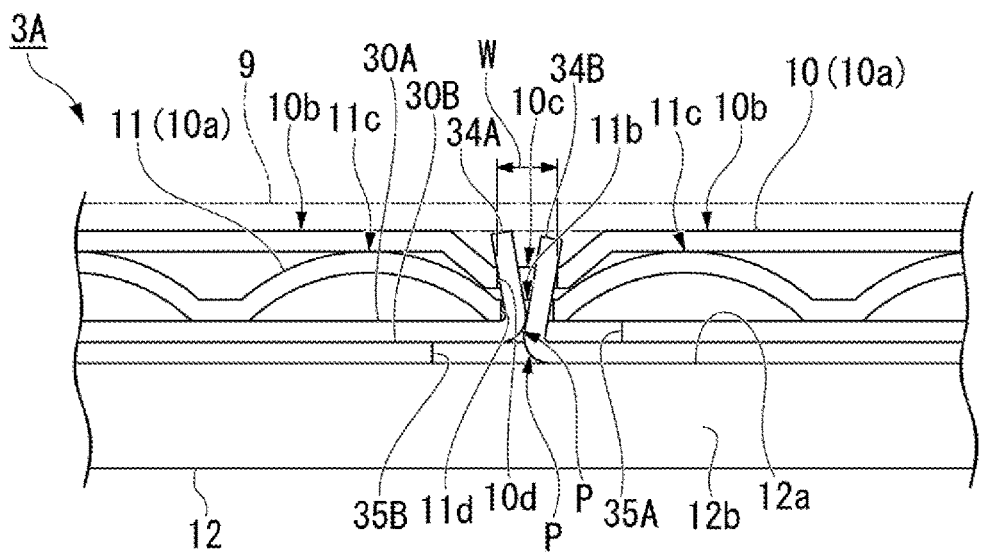
FIG. 10 is an enlarged front view illustrating a state where the first base sheet and the second base sheet are engaged with the intermediate foil and the back foil according to the second embodiment of the present disclosure.

FIG. 8 is an unfolded and enlarged plan view of a first base sheet 30A and a second base sheet 30B in a state of being engaged with the intermediate foil 10 and the back foil 11 according to the second embodiment of the present disclosure. FIG. 9A is an unfolded and enlarged plan view of the first base sheet 30A according to the second embodiment of the present disclosure. FIG. 9B is an unfolded and enlarged plan view of the second base sheet 30B according to the second embodiment of the present disclosure. FIG. 10 is an enlarged front view illustrating a state where the first base sheet 30A and the second base sheet 30B are engaged with the intermediate foil 10 and the back foil 11 according to the second embodiment of the present disclosure.

Although the radial foil bearing 3 of the first embodiment described above includes one base sheet 30, a radial foil bearing 3A of the second embodiment includes the first base sheet 30A and the second base sheet 30B as illustrated in FIG. 10. The first base sheet 30A has substantially the same configuration as the base sheet 30 of the first embodiment, and includes a first extension portion 34A extending from the first branch P and notches 35A in both end edges of the base sheet 30A in the axial direction as illustrated in FIG. 9A. On the inner peripheral side of the intermediate foil 10 passing through the notch 11d and the notch 10d, the first extension portion 34A extends to one side of the insertion hole 12a in the circumferential direction (left side of the page of FIG. 10), as illustrated in FIG. 10.

On the other hand, the second base sheet 30B is disposed on the inner peripheral surface of the insertion hole 12a and supports the first base sheet 30A from the outside in the radial direction. The second base sheet 30B includes a second extension portion 34B that is inserted into the notch 35A of the first base sheet 30A.

On the inner peripheral side of the intermediate foil 10 passing through the notch 35A, the notch 11d, and the notch 10d, the second extension portion 34B extends to the other side of the insertion hole 12a in the circumferential direction (right side of the page of FIG. 10). The second base sheet 30B also has substantially the same configuration as the base sheet 30 of the first embodiment, and includes the second extension portion 34B extending from the second branch P and notches 35B in both end edges of the base sheet 30B in the axial direction as illustrated in FIG. 9B. The first extension portion 34A and the second extension portion 34B extend toward the inner side in the radial direction to be separated from each other in the circumferential direction. That is, the first extension portion 34A and the second extension portion 34B each have a wedge shape toward the outer side in the radial direction.

As illustrated in FIG. 10, each of the first and second extension portions 34A and 34B extends to the outside of the formation range W of the notch 10d in the circumferential direction. In the configuration, a retaining effect of the back foil piece 11a and the intermediate foil piece 10a in the radial direction is high, and the disassembly and coming-off of the back foil 11 and the intermediate foil 10 can be reliably suppressed. In addition, when a fluctuating load is generated due to the shaft vibration of the rotary shaft 1, in addition to the "slip" described above, "slip" between the first base sheet 30A and the second base sheet 30B occurs. Since this causes energy dissipation due to friction, an attenuation effect is high.

Third Embodiment

Next, a third embodiment of the present disclosure will be described. In the following description, configurations which are the same or equivalent to the embodiments described above will be assigned with the same reference signs, and a description thereof will be simplified or omitted.

Figure 11A:
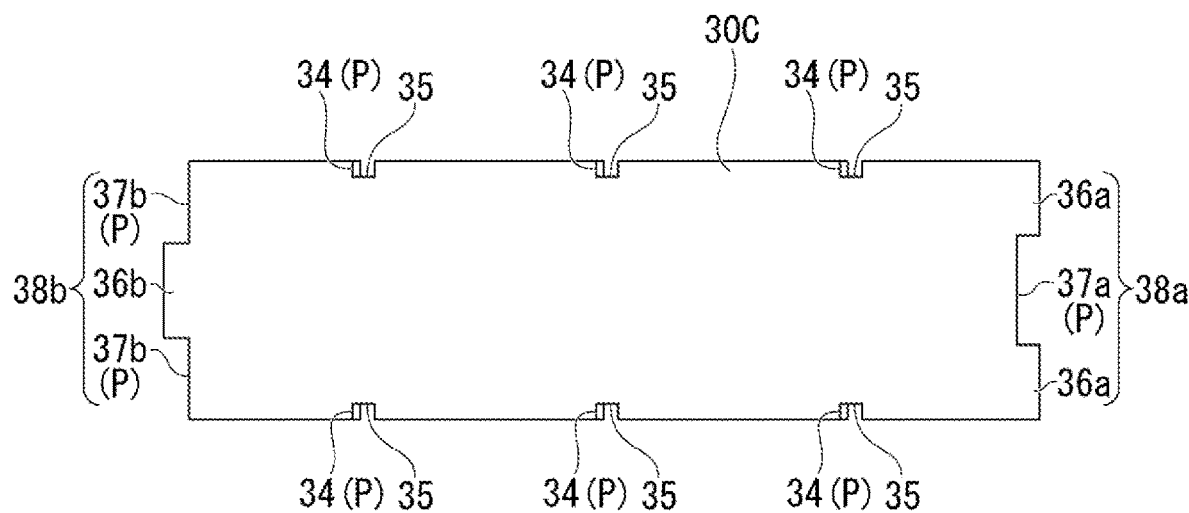
FIG. 11A is an unfolded plan view of a base sheet according to a third embodiment of the present disclosure.
Figure 11B:
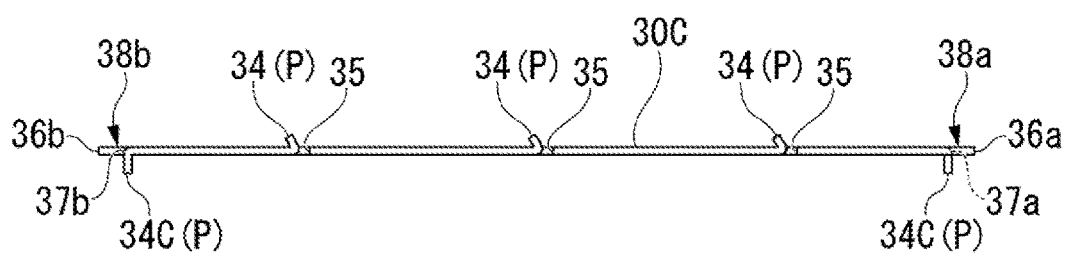
FIG. 11B is an unfolded front view of the base sheet according to the third embodiment of the present disclosure.
Figure 12A:
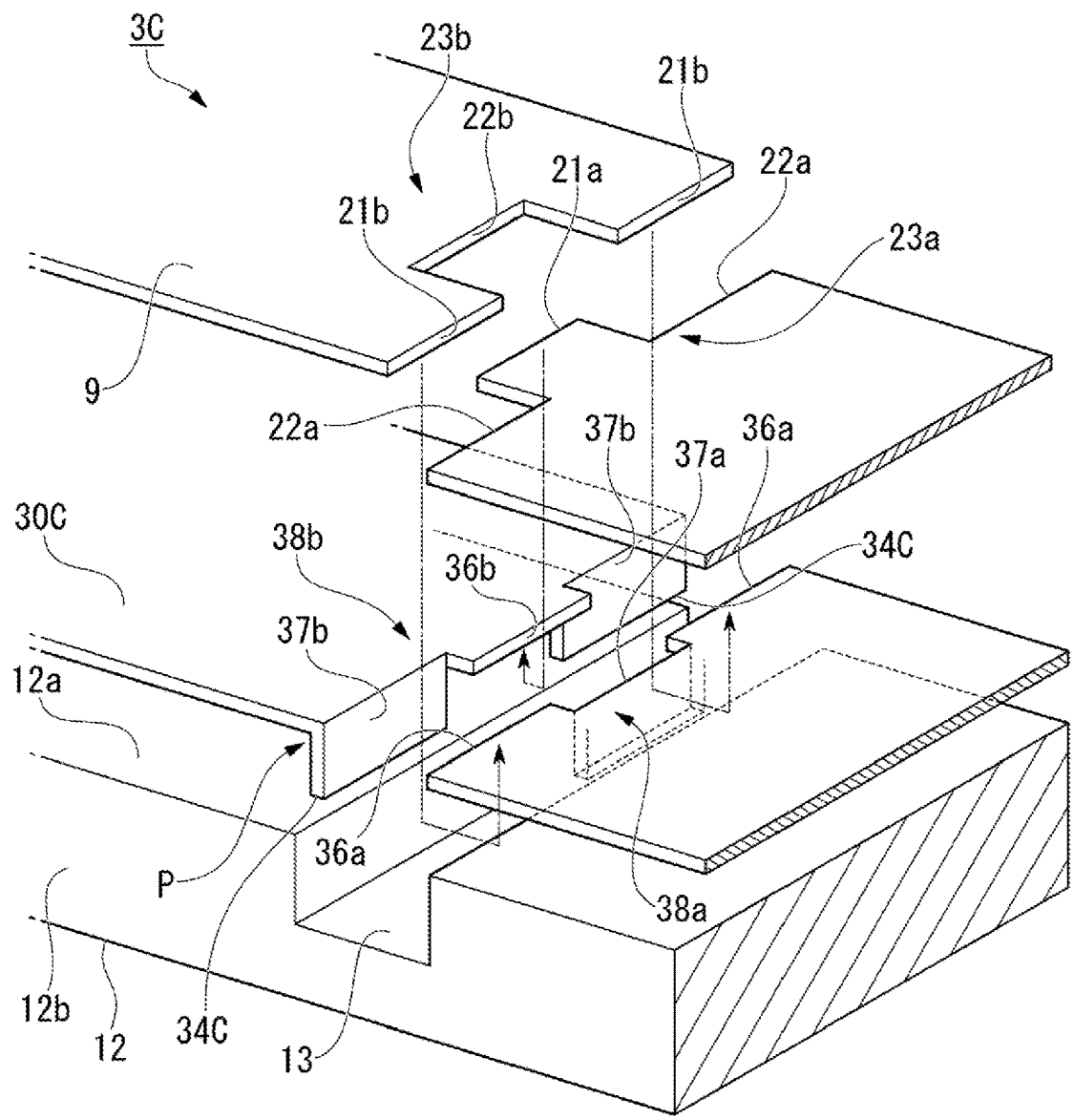
FIG. 12A is a perspective view for describing a state where the base sheet is engaged with a top foil according to the third embodiment of the present disclosure.
Figure 12B:
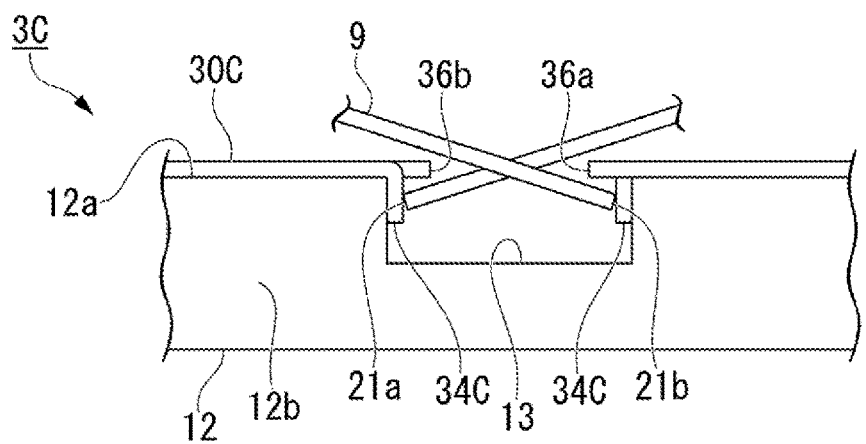
FIG. 12B is a front view for describing a state where the base sheet is engaged with the top foil according to the third embodiment of the present disclosure.

FIG. 11A is an unfolded plan view of a base sheet 30C according to the third embodiment of the present disclosure. FIG. 11B is an unfolded front view of the base sheet 30C according to the third embodiment of the present disclosure. FIG. 12A is a perspective view for describing a state where the base sheet 30C is engaged with the top foil 9 according to the third embodiment of the present disclosure. FIG. 12B is a front view for describing a state where the base sheet 30C is engaged with the top foil 9 according to the third embodiment of the present disclosure.

As illustrated in FIGS. 12A and 12B, a radial foil bearing 3C of the third embodiment is different from the embodiments in that the base sheet 30C has protruding portions 36a and 36b (engaging protrusion portions) engaged, in the radial direction, with the protruding portions 21a and 21b of the top foil 9 inserted into the through-groove 13.

As illustrated in FIG. 11A, on a first short side of the base sheet 30C in the long side direction, a first uneven portion 38a having two protruding portions 36a spaced apart from each other in the short side direction and one recessed portion 37a positioned between the two protruding portions 36a is formed. That is, on the short side of the base sheet 30C positioned on the first side in the long side direction, the recessed portion 37a recessed to the second side in the long side direction and steps positioned on both sides of the recessed portion 37a in the short side direction are provided.

In addition, on a second short side (a short side positioned on the second side in the long side direction) which is opposite to the first short side of the base sheet 30C, a second uneven portion 38b having one protruding portion 36b protruding to the second side in the long side direction and two recessed portions 37b formed on both sides of the protruding portion 36b in the short side direction is formed. That is, the second short side of the base sheet 30C in the long side direction includes one protruding portion 36b protruding to the second side in the long side direction and a step connected to both sides of the protruding portion 36b in the short side direction.

The disposition of the first uneven portion 38a and the second uneven portion 38b of the base sheet 30C and the disposition of the first uneven portion 33a and the second uneven portion 33b of the base sheet 30 illustrated in FIG. 6 are in a relationship reversed in the long side direction. Unlike the first embodiment described above, the recessed portions 37a and 37b of the base sheet 30C are formed by the through-groove branches P. As illustrated in FIG. 11B, the through-groove branches P are deviated to the outer side in the radial direction of the insertion hole 12a (a lower side of the page of FIG. 11B). As illustrated in FIG. 12B, through-groove extension portions 34C extending from the through-groove branches P are inserted in the through-groove 13 and are engaged in the circumferential direction with side wall portions of the through-groove 13 by a back spring of the base sheet 30C.

On the other hand, the protruding portions 36a and 36b of the base sheet 30C extend onto the through-groove 13 as illustrated in FIG. 12B. That is, the protruding portions 36a and 36b of the base sheet 30C are disposed above the through-groove 13 with a gap. As illustrated in FIG. 12A, the protruding portion 21a of the top foil 9 is inserted (disposed) on the inner side in the radial direction of the protruding portion 36b of the base sheet 30C. In addition, the two protruding portions 21b of the top foil 9 are inserted (disposed) on the inner side in the radial direction of the two protruding portions 36a of the base sheet 30C. In the configuration, a retaining effect of the top foil 9 in the radial direction is high, and the coming-off of the top foil 9 can be reliably suppressed. In addition, in the configuration, since a contact area between the base sheet 30C and the bearing housing 12 increases, an attenuation effect due to the "slip" described above is high.

Figure 13A:
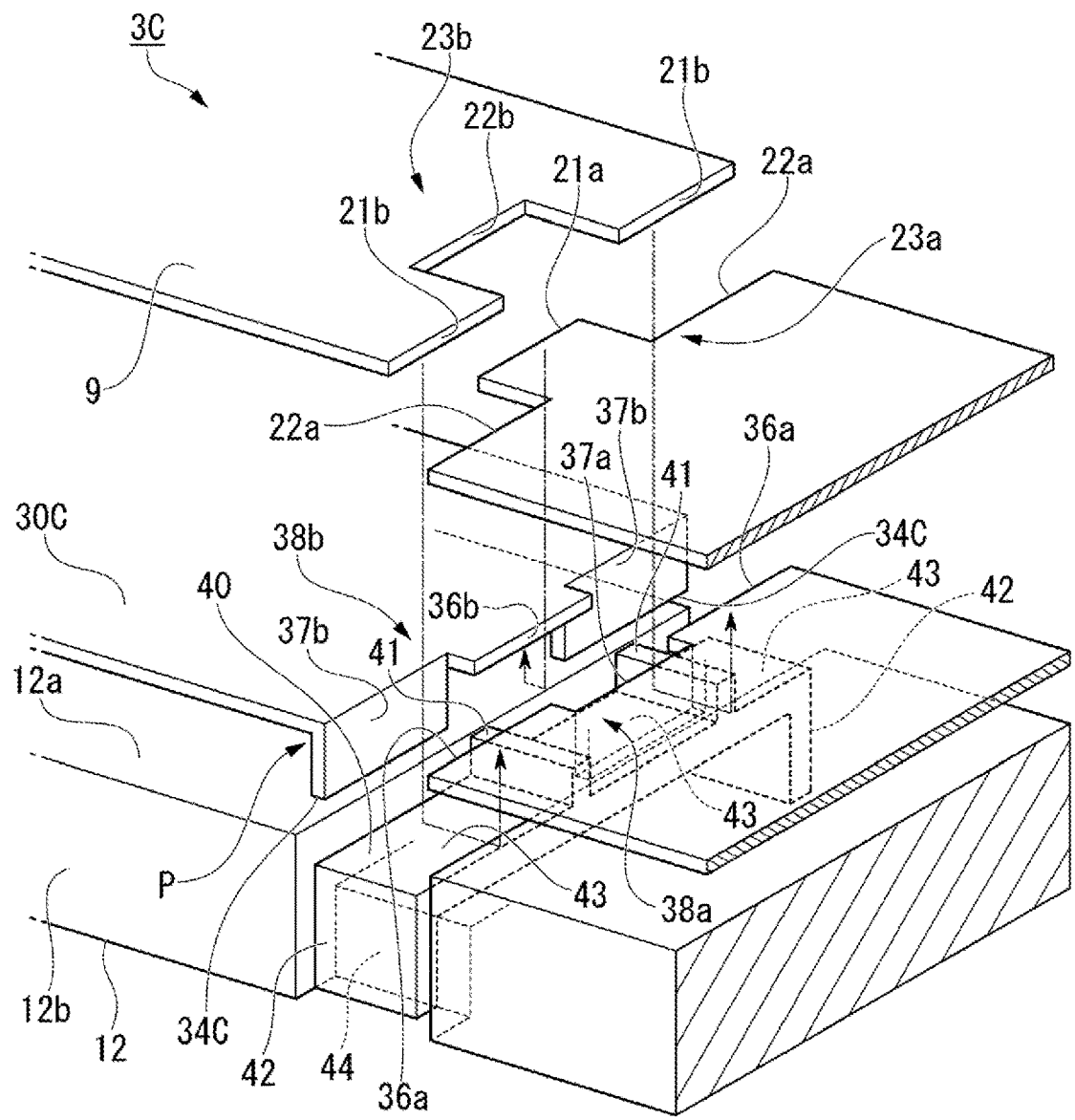
FIG. 13A is a perspective view for describing a state where a base sheet is engaged with a top foil according to a modification example of the third embodiment of the present disclosure.
Figure 13B:
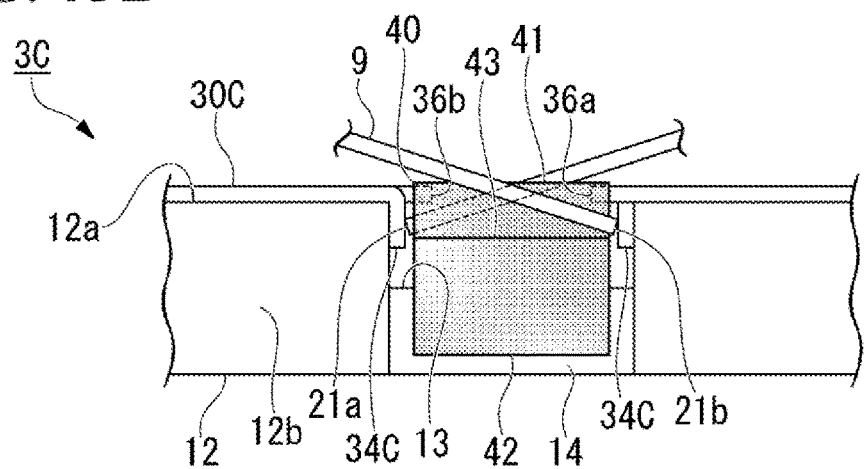
FIG. 13B is a front view for describing the state where the base sheet is engaged with the top foil according to the modification example of the third embodiment of the present disclosure.

In the third embodiment, as illustrated in FIGS. 13A and 13B, a locking tool 40 may be disposed in the through-groove 13. The locking tool 40 corresponds to a fixing tool indicated with the reference sign 16 in a part (a) of FIG. 3 of Patent Document 6. That is, in a modification example illustrated in FIGS. 13A and 13B, a locking groove 44 which communicates with both end portions of the through-groove 13 and extends in the radial direction is formed, and the locking tool 40 includes a pair of leg portions 42 inserted into the locking groove 44. In addition, the locking tool 40 includes, between the pair of leg portions 42, two partition wall pieces 41 protruding to a side opposite to the leg portions 42. The two partition wall pieces 41 form three locking grooves 43 which are almost divided in three in the axial direction.

One protruding portion 21a and two protruding portions 21b of the top foil 9 are disposed in the three locking grooves 43 respectively, and face the partition wall pieces 41 in the axial direction. In addition, two protruding portions 36a and one protruding portion 36b of the base sheet 30C are disposed in the three locking grooves 43 respectively, and face the partition wall pieces 41 in the axial direction. In the configuration, the movement of the top foil 9 and the base sheet 30C in the axial direction is suppressed, and the coming-off of the top foil 9 and the base sheet 30C can be more reliably suppressed.

Fourth Embodiment

Next, a fourth embodiment of the present disclosure will be described. In the following description, configurations which are the same or equivalent to the embodiments described above will be assigned with the same reference signs, and a description thereof will be simplified or omitted.

Figure 14:
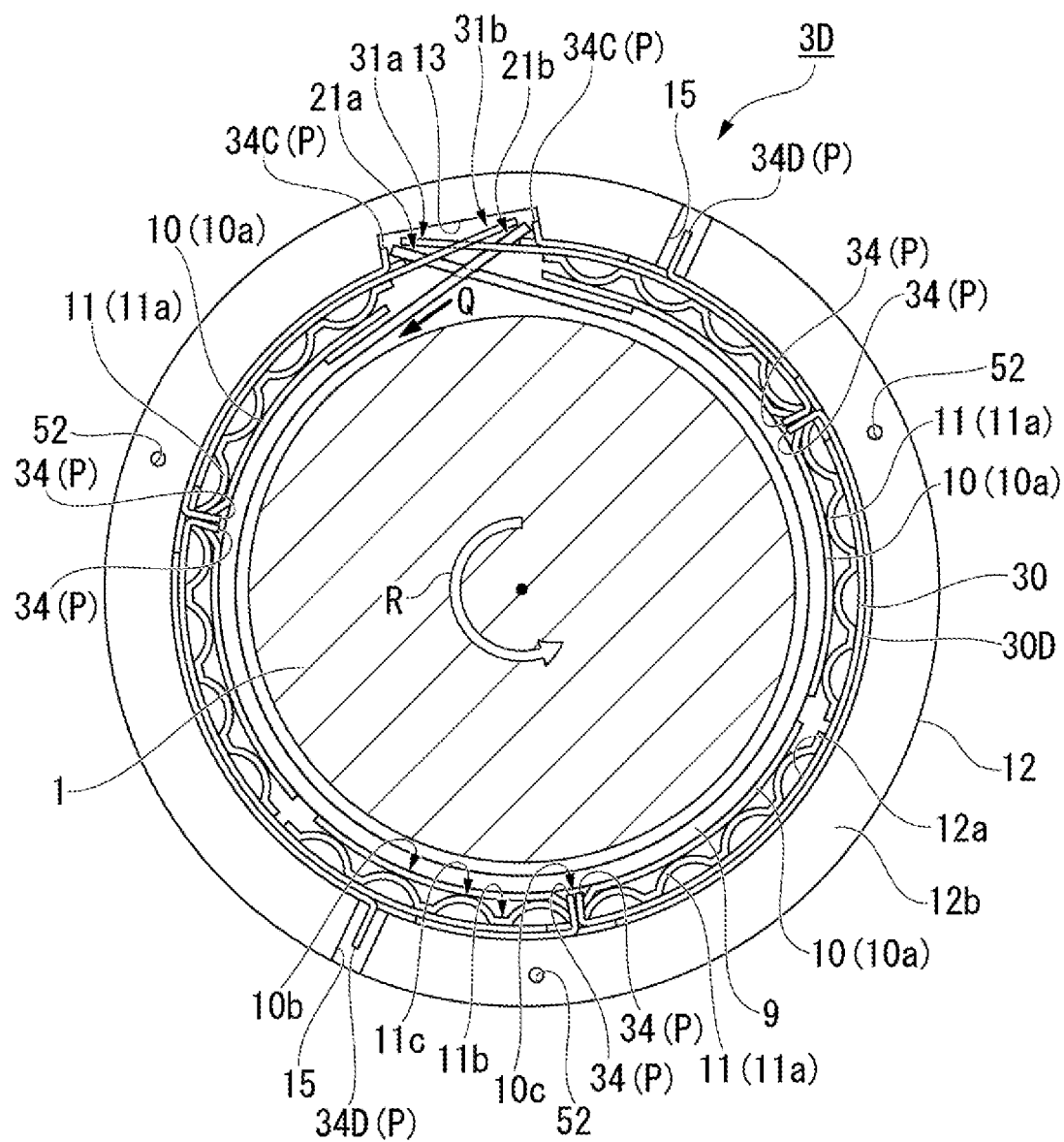
FIG. 14 is a front view illustrating a radial foil bearing according to a fourth embodiment of the present disclosure.
Figure 15:
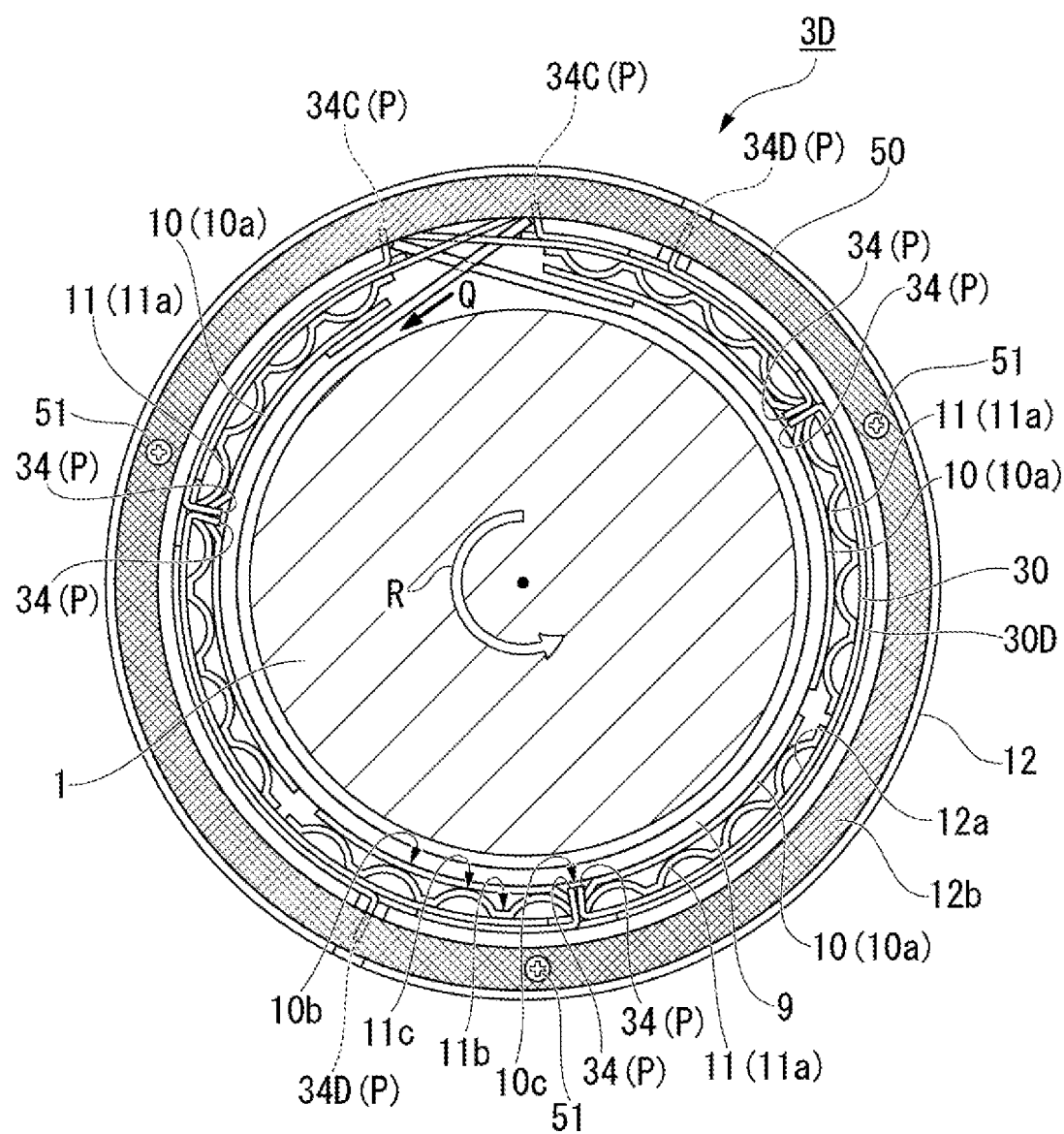
FIG. 15 is a front view illustrating a state where a lid body is attached to the radial foil bearing according to the fourth embodiment of the present disclosure.
Figure 16A:
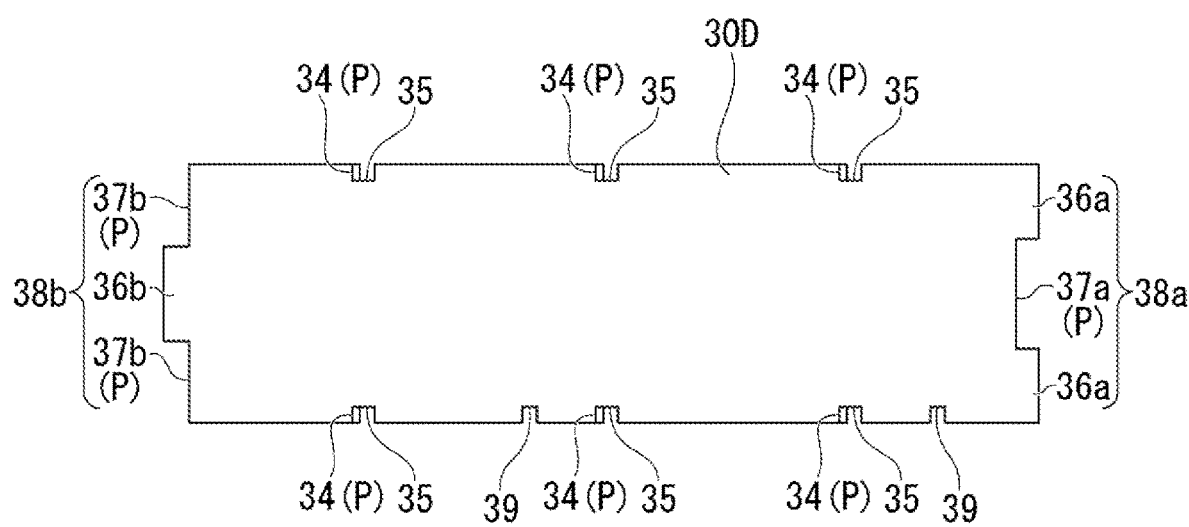
FIG. 16A is an unfolded plan view of a base sheet according to the fourth embodiment of the present disclosure.
Figure 16B:
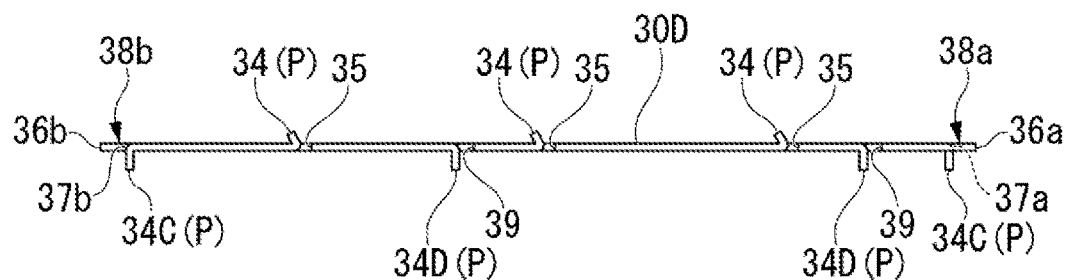
FIG. 16B is an unfolded front view of the base sheet according to the fourth embodiment of the present disclosure.

FIG. 14 is a front view illustrating a radial foil bearing 3D according to the fourth embodiment of the present disclosure. FIG. 15 is a front view illustrating a state where a lid body 50 is attached to the radial foil bearing 3D according to the fourth embodiment of the present disclosure. FIG. 16A is an unfolded plan view of the base sheet 30D according to the fourth embodiment of the present disclosure. FIG. 16B is an unfolded front view of the base sheet 30D according to the fourth embodiment of the present disclosure.

The radial foil bearing 3D according to the fourth embodiment is different from the embodiments in that the radial foil bearing includes the base sheet 30D (second base sheet) on the outer side in the radial direction of the base sheet 30 which is the same as the first embodiment, the base sheet 30D has the housing groove branches P deviated to the outer side in the radial direction of the insertion hole 12a, and housing groove extension portions 34D extending from the housing groove branches P are engaged with the bearing housing 12 in the axial direction, as illustrated in FIG. 14.

As illustrated in FIG. 16A, similar to the base sheet 30C of the third embodiment, the base sheet 30D includes the first uneven portion 38a on a first short side in the long side direction, and includes the second uneven portion 38b on a second short side opposite to the first short side. In addition, notches 39 are formed in one end edge of the base sheet 30D in the axial direction. As illustrated in FIG. 16B, the notches 39 are recessed portions formed by cutting and raising parts of the base sheet 30D to form the housing groove extension portions 34D. That is, the housing groove extension portions 34D extending to the outer side in the radial direction of the insertion hole 12a are formed on the one end edge of the base sheet 30D in the axial direction. The housing groove extension portions 34D are formed on only one end edge of the base sheet 30D in the axial direction in consideration of the ease of incorporating the base sheet 30D into the bearing housing 12.

As illustrated in FIG. 14, housing grooves 15 extending toward the outer side in the radial direction from an inner peripheral edge of the insertion hole 12a are formed in one end surface 12b of the bearing housing 12 in the axial direction. That is, the end surface 12b of the bearing housing 12 in the axial direction includes recessed portions extending to an inner periphery of the bearing housing 12. Each housing groove 15 is formed at positions where the end surface 12b of the bearing housing 12 is almost divided in two in the circumferential direction. Then, each of the housing groove extension portions 34D is inserted in the radial direction in each of the housing grooves 15.

As illustrated in FIG. 15, the lid bodies 50 are attached to both end surfaces 12b of the bearing housing 12 in the axial direction. The lid body 50 covers the housing grooves 15 that house the housing groove extension portions 34D. The lid body 50 of the present disclosure is formed in an annular plate shape along the circumferential direction of the bearing housing 12. The diameter of an inner peripheral edge of the lid body 50 is larger than the diameter of an inner peripheral edge of the bearing housing 12, and the diameter of an outer peripheral edge of the lid body 50 is smaller than the diameter of an outer peripheral edge of the bearing housing 12.

The lid body 50 is screwed into screw holes 52 (refer to FIG. 14) formed in both end surfaces 12b of the bearing housing 12 in the axial direction by screws 51. Each lid body 50 is screwed at positions where the end surface 12b of the bearing housing 12 is almost divided in three in the circumferential direction. In the configuration, since the housing groove extension portions 34D are covered with the lid body 50, the coming-off of the base sheet 30D from the bearing housing 12 in the axial direction can be suppressed even without the locking tool 40 described above. In addition, since the lid body 50 closes a part of an opening end of the through-groove 13 and also covers the through-groove extension portions 34C of the base sheet 30D inserted in the through-groove 13, the coming-off of the base sheet 30D from the bearing housing 12 in the axial direction can be suppressed.

Although some embodiments of the present disclosure have been described hereinbefore with reference to the drawings, the present disclosure is not limited to the embodiments. Various shapes and combinations of each component presented in the embodiments described above are merely examples, and a variety of changes can be made based on design requirements without departing from the scope of the present disclosure defined in claims.

For example, the radial foil bearing including the intermediate foil in the embodiments is an exemplary example. However, a configuration where the base sheet is hooked only onto the back foil without the intermediate foil may be adopted.

In addition, for example, the radial foil bearing including the two base sheets in the second embodiment is an exemplary example. However, two extension portions deviated from one base sheet to the inner side in the radial direction of the insertion hole and extended to one side and the other side in the circumferential direction may be formed.

In addition, for example, the radial foil bearing to which the lid bodies are attached to both end surfaces of the bearing housing in the axial direction in the fourth embodiment is an exemplary example. However, in a case where one end surface of the bearing housing in the axial direction is attached to, for example, an attachment target (a support flange or the like), a configuration where the lid body is attached to only the other end surface of the bearing housing in the axial direction may be adopted.

INDUSTRIAL APPLICABILITY

In the radial foil bearing of the present disclosure, the disassembly and coming-off of the component of the radial foil bearing can be suppressed without using welding.

What is claimed is:
1. A radial foil bearing comprising:
 a bearing housing that has an insertion hole into which a shaft is to be inserted;
 a base sheet that is disposed in the insertion hole;
 a back foil that is supported by the base sheet and has unevenness in a radial direction of the insertion hole; and
 a top foil that is supported by the back foil,
 wherein the back foil has a notch in an end edge in an axial direction in which the insertion hole extends,
 wherein the base sheet has a first branch deviated in the radial direction of the insertion hole, and
 wherein a first extension portion extending from the first branch is inserted into the notch.
2. The radial foil bearing according to claim 1,
 wherein the first extension portion passes through the notch to an inner peripheral side of the back foil and extends to one side in a circumferential direction of the insertion hole.

3. The radial foil bearing according to claim 2, wherein the base sheet includes
a first base sheet that has the first branch, the first extension portion, and a notch in an end edge in the axial direction, and
a second base sheet that supports the first base sheet, has a second branch deviated in the radial direction of the insertion hole, and has a second extension portion extending from the second branch inserted into the notches of the first base sheet and the back foil, and
on the inner peripheral side of the back foil, the second extension portion extends to the other side in the circumferential direction of the insertion hole.

4. The radial foil bearing according to claim 3, wherein
a through-groove extending in the axial direction from an end surface of the bearing housing is formed in the insertion hole, and
a through-groove extension portion extending from a through-groove branch of the second base sheet deviated in the radial direction of the insertion hole that is opposed from the radial direction that the first and second branches are deviated in is inserted into the through-groove.

5. The radial foil bearing according to claim 4, further comprising:
a housing groove that is provided in the end surface of the bearing housing in the axial direction and extends toward an outer side in the radial direction from an inner peripheral edge of the insertion hole,
wherein a housing groove extension portion extending from a housing groove branch of the second base sheet deviated in the radial direction of the insertion hole that is opposed from the radial direction that the first and second branches are deviated in is inserted into the housing groove.

6. The radial foil bearing according to claim 3, further comprising:
a housing groove that is provided in an end surface of the bearing housing in the axial direction and extends toward an outer side in the radial direction from an inner peripheral edge of the insertion hole,
wherein a housing groove extension portion extending from a housing groove branch of the second base sheet deviated in the radial direction of the insertion hole that is opposed from the radial direction that the first and second branches are deviated in is inserted into the housing groove.

7. The radial foil bearing according to claim 2, wherein
a through-groove extending in the axial direction from an end surface of the bearing housing is formed in the insertion hole, and
a through-groove extension portion extending from a through-groove branch of the base sheet deviated in the radial direction of the insertion hole that is opposed from the radial direction that the first branch is deviated in is inserted into the through-groove.

8. The radial foil bearing according to claim 7, further comprising:
a housing groove that is provided in the end surface of the bearing housing in the axial direction and extends toward an outer side in the radial direction from an inner peripheral edge of the insertion hole,
wherein a housing groove extension portion extending from a housing groove branch of the base sheet deviated in the radial direction of the insertion hole that is opposed from the radial direction that the first branch is deviated in is inserted into the housing groove.

9. The radial foil bearing according to claim 2, further comprising:
a housing groove that is provided in an end surface of the bearing housing in the axial direction and extends toward an outer side in the radial direction from an inner peripheral edge of the insertion hole,
wherein a housing groove extension portion extending from a housing groove branch of the base sheet deviated in the radial direction of the insertion hole that is opposed from the radial direction that the first branch is deviated in is inserted into the housing groove.

10. The radial foil bearing according to claim 1, wherein
a through-groove extending in the axial direction from an end surface of the bearing housing is formed in the insertion hole, and
a through-groove extension portion extending from a through-groove branch of the base sheet deviated in the radial direction of the insertion hole that is opposed from the radial direction that the first branch is deviated in is inserted into the through-groove.

11. The radial foil bearing according to claim 10, wherein
an end portion of the top foil is inserted into the through-groove, and
the base sheet has an engaging protrusion portion that extends into the through-groove and engages with the end portion of the top foil in the radial direction.

12. The radial foil bearing according to claim 11, wherein
the top foil comprises two end portions,
a first end and a second end are inserted as the end portions of the top foil into the through-groove,
the top foil has a part extending from the first end to one side in a circumferential direction of the insertion hole and a part extending from the second end to the other side in the circumferential direction, which intersect each other in the axial direction, and
the engaging protrusion portion extends into the through-groove and engages with both of the intersecting ends of the top foil in the radial direction.

13. The radial foil bearing according to claim 11, further comprising:
a housing groove that is provided in the end surface of the bearing housing in the axial direction and extends toward an outer side in the radial direction from an inner peripheral edge of the insertion hole,
wherein a housing groove extension portion extending from a housing groove branch of the base sheet deviated in the radial direction of the insertion hole that is opposed from the radial direction that the first branch is deviated in is inserted into the housing groove.

14. The radial foil bearing according to claim 10, further comprising:
a lid body that is attached to the end surface of the bearing housing in the axial direction and covers the through-groove extension portion.

15. The radial foil bearing according to claim 10, further comprising:
a housing groove that is provided in the end surface of the bearing housing in the axial direction and extends toward an outer side in the radial direction from an inner peripheral edge of the insertion hole,
wherein a housing groove extension portion extending from a housing groove branch of the base sheet deviated in the radial direction of the insertion hole that is opposed from the radial direction that the first branch is deviated in is inserted into the housing groove.

16. The radial foil bearing according to claim 1, further comprising:
- a housing groove that is provided in an end surface of the bearing housing in the axial direction and extends toward an outer side in the radial direction from an inner peripheral edge of the insertion hole,
- wherein a housing groove extension portion extending from a housing groove branch of the base sheet deviated in the radial direction of the insertion hole that is opposed from the radial direction that the first branch is deviated in is inserted into the housing groove.

\* \* \* \* \*